Figure 1:
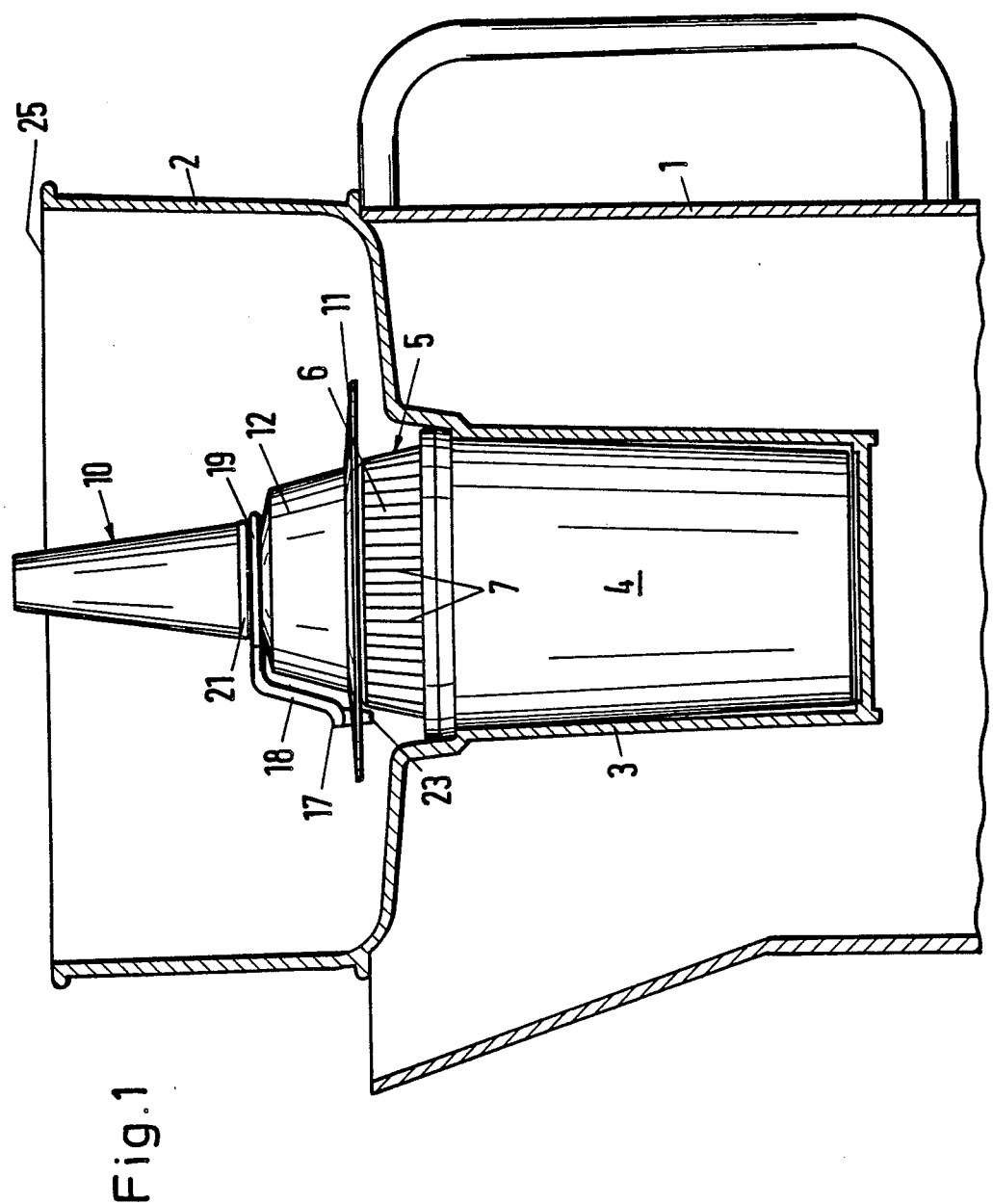

United States Patent [19]

Hankammer

[11] Patent Number: 4,895,648
[45] Date of Patent: Jan. 23, 1990

[54] FILTER COVER FOR A PURIFICATION INSERT IN A WATER TREATMENT DEVICE WITH A HOLLOW TUBE

[75] Inventor: Heinz Hankammer, Taunusstein, Fed. Rep. of Germany

[73] Assignee: Brita Wasser-Filter-Systeme GmbH, Taunusstein, Fed. Rep. of Germany

[21] Appl. No.: 316,871

[22] Filed: Feb. 28, 1989

[30] Foreign Application Priority Data

Apr. 30, 1988 [DE] Fed. Rep. of Germany ....... 3814683

[51] Int. Cl.$^4$ .......................... B01D 19/00; B01D 35/00
[52] U.S. Cl. ...................................... 210/188; 210/232; 210/470; 210/472; 210/474; 210/477
[58] Field of Search ............... 210/188, 232, 264, 282, 210/470, 482, 474–477

[56] References Cited

U.S. PATENT DOCUMENTS

| | | | |
|---|---|---|---|
| 4,623,457 | 11/1986 | Hankammer | 218/475 X |
| 4,764,274 | 8/1988 | Miller | 210/232 |
| 4,775,629 | 10/1988 | Kuhl et al. | 210/282 X |

FOREIGN PATENT DOCUMENTS 2550573 5/1977 Fed. Rep. of Germany .

Primary Examiner—Charles Hart
Attorney, Agent, or Firm—Paul & Paul

[57] ABSTRACT

Described is a filter cover for a purification insert (4) in a water treatment device, wherein the filter cover (5) has filter slots (7) on a conical surface portion (6) and at least one vent opening (9) in the middle of a raised connecting portion (8), and can be connected to a hollow tube (10) with a disc (11).

So that operation and handling, in particular venting and manipulation by the end consumer, are improved in the case of such a filter cover, it is provided that the filter slots (7) are substantially straight and are arranged in a ring-like configuration on the frustoconical surface portion (6) which occupies about ⅓ to ½ of the height of the filter cover (5) and that provided on the upper outer annular surface of the disc (11) are markings (15, 16) with which there is associated an adjustable pointer (17) mounted on an arresting ring (19) which is arranged non-detachably and rotatably on the hollow tube (10).

7 Claims, 3 Drawing Sheets

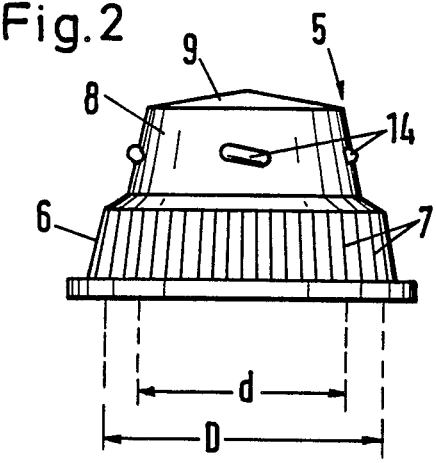
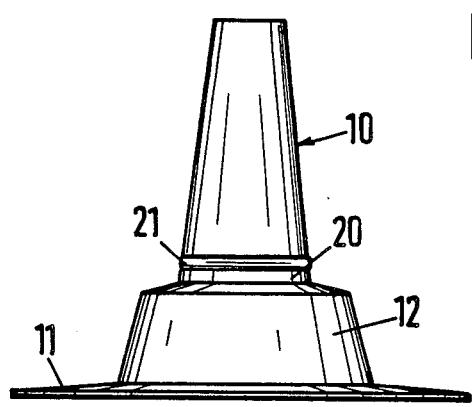
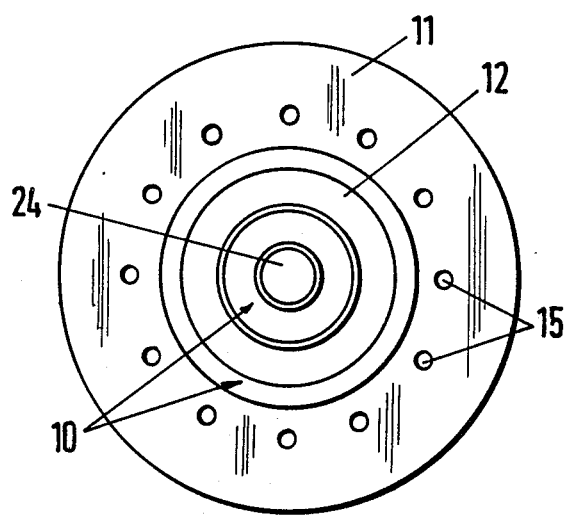

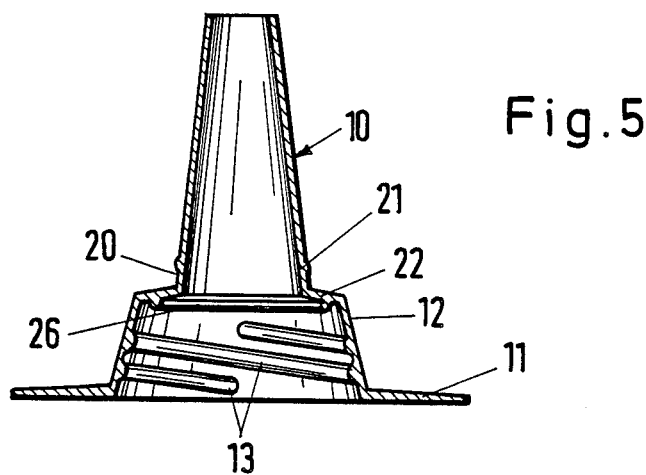
Fig. 5
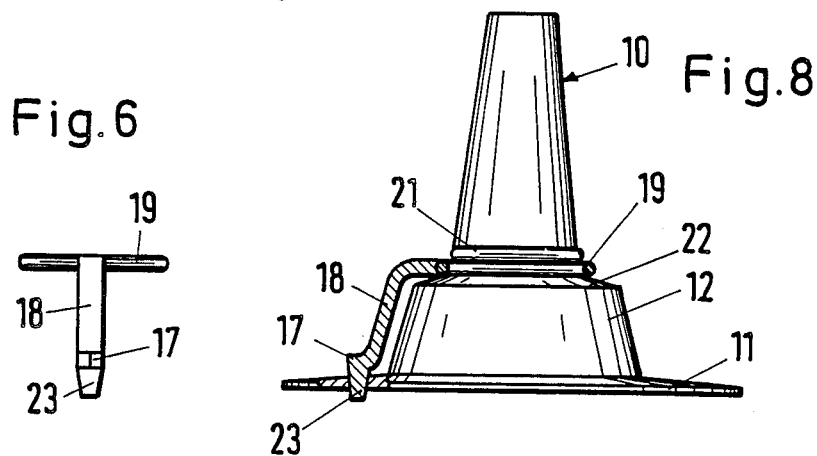
Fig. 6
Fig. 8
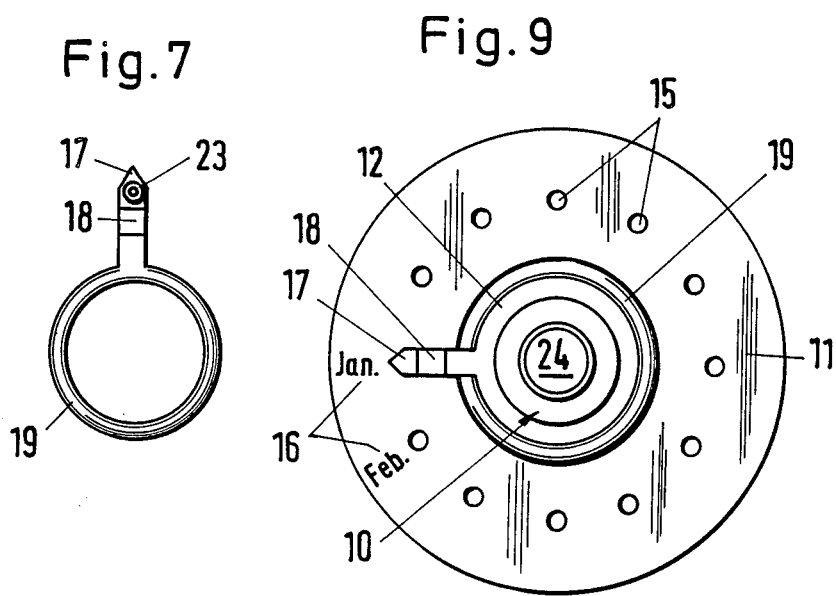
Fig. 7
Fig. 9

FILTER COVER FOR A PURIFICATION INSERT IN A WATER TREATMENT DEVICE WITH A HOLLOW TUBE

The invention relates to a filter cover for a purification insert in a water treatment device, wherein the filter cover has filter slots on a conical surface portion and at least one vent opening in the middle of a raised connecting portion, and can be connected to a hollow tube with a disc.

Water treatment devices of a wide range of kinds are known, using different forms of filter covers.

In a known water treatment device, a funnel which is open upwardly and which is provided with a sleeve at the bottom in the middle thereof is fitted on to the upper edge of a collecting container. A purification insert is introduced into the downwardly open sleeve in such a way that the filter cover terminates approximately with the bottom of the funnel and the filter bottom terminates with the lower end of the sleeve which projects into the container. Water to be purified is poured into the funnel at the top and flows by way of the filter slots in the filter cover through the purification insert which is filled for example with purification agent in granulate form, under the effect of the force of gravity, downwardly through the filter bottom, and accumulates in the collecting container as treated or purified or filtered water.

In the known water treatment device the filter slots were provided on the conical surface portion of the filter cover in the form of concentric circles surrounding a raised connecting portion arranged at the centre. A hollow tube with an umbrella-shaped disc is fitted on to the raised portion which is approximately of finger thickness. Air which has accumulated in the upper part of the filter cover is intended to escape upwardly through the hollow tube and the umbrella-shaped disc serves to ensure that, when fresh water is poured into the funnel, undesired through-flow passages are not flushed out in the purification insert when the water is poured in. On the contrary, when the water is poured in, the jet of water impinges on the annular surface of the disc and is thereafter distributed over the substantially horizontally disposed annular funnel bottom from which the water to be purified flows into the slots in the filter cover.

In order to be able to offer the end consumer further improvements in the known water treatment devices, consideration has been given as to where any disadvantages encountered could be overcome. Thus, in connection with the concentrically arranged annular filter slots, it was found that it is not always possible reliably to exclude interlacing so that the through-flow of the water to be purified is partially impeded by the configuration, position and arrangement of the filter slots. It was also found that the hollow tube cannot always be reliably connected to the filter cover in such a way that the end consumer can withdraw the purification insert in its entirety with one grasp when gripping the hollow tube and pulling it upwardly in the direction of the main axis of the device. On the contrary in many cases the hollow tube with the disc has come loose from the filter cover and thus the purification insert.

Another disadvantage arises from the point of view of the end consumer in the known water treatment devices if the purification agent is not replaced in good time. For example the ion exchangers which are generally used nowadays in the known devices have a capacity for cleaning about 60 to 100 l of water. In the normal household therefore a water treatment device of the above-indicated kind can provide for satisfactory and hygienic operation for a period of two to four weeks with one and the same purification insert and the purification material contained therein. At any event, for reasons of hygiene, the purification agent, for example with an ion exchanger, should not be in use for much longer than one month. After that the purification agent should be replaced. It would therefore be desirable to provide a time display so that the purification agent can be replaced at the proper time.

Water treatment devices are also already known in which the filter cover with the concentric filter slots is fixedly connected to the hollow tube. Admittedly, with those devices, when the hollow tube is grasped, the purification insert can reliably be pulled out of the sleeve of the funnel for the purposes of replacing the purification insert, but that construction has a filter cover which is of a flat configuration with considerable venting problems, while in addition the through-flow speed of the water to be purified is too low due to the interlacing of the filter slots.

The venting problem also plays a part in connection with another filter cartridge in which an entirely different configuration of filter cover has been adopted, namely the concentric annular configuration of the filter slots has been abandoned, in favour of a filter cover of a very flat configuration with a short cylindrical outside surface along which small straight filter slots are arranged distributed around the entire periphery in the form of a ring. Contrary to expectation, that filter cartridge has also suffered the difficulty of inadequate venting and excessive interlacing of the filter slots so that once again different forms of filter covers with filter slots arranged in a concentric circular configuration have been adopted.

The invention is now based on the problem of providing a filter cover of the kind set forth in greater detail in the opening part of this specification and the function and handling of which are improved, in particular in regard to venting and manipulation by the end consumer, including in regard to replacement of purification agent at the proper time.

In accordance with the invention that problem is solved in that the filter slots are substantially straight and are arranged in a ring-like configuration on the frustoconical surface portion which occupies about $\frac{1}{3}$ to $\frac{1}{2}$ of the height of the filter cover and that provided on the upper outer annular surface of the disc are markings with which there is associated an adjustable pointer mounted on an arresting ring which is arranged non-detachably and rotatably on the hollow tube. Although the configuration of the purification insert with hollow tube and disc is used, in accordance with the invention the idea has been taken up again, from a different context, of making the filter slots substantially straight and arranging them in a ring-like configuration on the filter cover. In that arrangement the filter slots will be disposed substantially parallel to each other and they are preferably disposed at uniform spacings from each other. The direction of the straight filter slots is generally the same as the direction of the main axis of the funnel or its sleeve or also that of the hollow tube. It is also possible however to envisage the straight filter slots being arranged at one or more different angles relative to the main axis of the purification insert. In accordance with the invention it has been found that the rate of through-flow of water remains unimpaired and a good flow of water into the purification insert through the filter slots is guaranteed when the annular surface along which the filter slots are arranged in a ring occupies about ⅓ to about half the height of the overall filter cover. In other words, in contrast to the known form of filter cover with the straight filter slots, the invention has gone over to making the filter cover about twice to three times as high as the height of the frustoconical annular surface portion with the filter slots. Specifically, in that way any air or gases entrained with the water to be purified and passing into the filter slots can accumulate in the space above the filter slots and issue through the hollow tube.

In the case of the filter cover described in the opening part of this specification, with the hollow tube, openings between the hollow tube and the raised connecting portion of the filter cover were provided or were at least inevitable so that venting in that arrangement caused difficulties from time to time. The features according to the invention provide that the function of the filter cover is substantially improved because the intake of water through the filter slots is no longer adversely affected and the venting action is also substantially improved.

Added to that is the considerable improvement in regard to handling from the point of view of the end consumer. Not only can the end consumer better remove the purification insert by gripping the hollow tube and thus handle the arrangement in that way, but in addition the end consumer can also replace the purification agent at the proper time because by virtue of the markings and the adjustable pointer, he can measure the time since the last purification agent was introduced. By virtue of the features according to the invention, either when the end consumer purchases the new purification insert or the water treatment device on the one hand or when he replaces the purification agent in the insert on the other hand, by rotating the pointer by means of the arresting ring he can set the pointer to a given marking, for example the name of a month, so that after a period of about 30 days has passed, he has a clear indication that the purification agent was to be replaced. In that connection it is advantageous that the pointer is arranged non-detachably but nonetheless rotatably on the hollow tube, by way of the arresting ring.

The configuration of the filter cover has been altered in order to improve the function of the arrangement and in this case in particular the venting effect. More specifically the invention provides that, in a further embodiment of the filter cover the arresting ring is held in an annular undercut configuration and arranged between the undercut configuration and the disc on the hollow tube is a frustoconical portion with an internal screwthread which can be screwed on to the external screwthread of the raised connecting portion of the filter cover. While in the known purification insert the press fit was often inadequate or the clamping connection between the hollow tube and the filter cover was not reliable in the course of time due to wear or deformation, the function of the arrangement is considerably improved in regard to manipulation on the part of the end consumer, by means of the screwthread configuration. That also improves the venting effect because the air guide paths are improved by virtue of a definedly firm fit for the hollow tube on the filter cover.

It will be appreciated that the annular undercut configuration for the arresting ring can be achieved by the provision on at least one side of the annular undercut configuration of a bead or a plurality of projections for retaining the arresting ring. When using the frustoconical portion with internal screwthread which is of a larger diameter than the hollow tube, then the one retaining edge for the arresting ring is already afforded by the frustoconical portion, and beads or projections only need to be provided on the other side of the undercut configuration relative to the frustoconical portion.

In accordance with the invention the hollow tube may also be provided with wing-like projections as in the case of the wing projections of a wing nut in order to make it easier to screw the hollow tube on to or off the filter cover.

In regard to the calendar function of the novel hollow tube, it is particularly desirable in accordance with the invention if the markings in the annular surface of the disc are in the form of holes, pins or the like, if an arresting tongue which engages over the frustoconical portion of the hollow tube is provided between the pointer and the arresting ring, and if the pointer is connected to an arresting means which can be associated with the markings. Although arresting means can be applied by printing or can be provided by applying labels or inscriptions, a marking may however also be provided in a very clear and practically indestructible form, in the shape of a hole or, as a kinematic reversal thereof, a pin. When the markings in the annular surface of the disc are holes, then the associated arresting means will desirably be a pin which is disposed beside the pointer so that the pointer can easily be associated with a month marking, for example 'May', by virtue of the arresting pin on the pointer being inserted into the corresponding hole beside the word 'May'. The end consumer then knows that he freshly filled purification agent into the purification insert in the month of May. It will be appreciated that the marking could also indicate the beginning, the middle or the end of a month so that the 30-day rhythm can be observed even more accurately.

It will be appreciated that conversely the marking may also consist of pins or projections on the disc so that the arresting means accordingly has holes beside the pointer. The mode of operation and handling from the point of view of the end consumer are in no way altered when using that kinematically reversed arrangement.

By virtue of the arresting tongue portion between the pointer and the arresting ring, the marking may also be arranged on the disc at a greater distance from the hollow tube. Generally the diameter of the hollow tube is less than the diameter of that ring on the disc on which the markings are arranged.

In another advantageous embodiment of the invention the raised connecting portion on the filter cover is in the form of an air collecting space and is of a diameter which is only immaterially smaller than the diameter of the frustoconical surface portion with the filter slots. By virtue of that arrangement, the invention surprisingly proposes a completely different configuration of the filter cover in comparison with the filter covers of the known water purification devices. To provide for a good flow of water into and through the filter slots, the diameter of the frustoconical surface portion with the filter slots is not substantially smaller than the largest outside diameter of the purification insert. In that way a large number of filter slots may be provided on a really large annular surface. If now, in contrast to the raised connecting portion in the known water treatment device referred to in the opening part of this specification, the raised connecting portion is of a comparably large diameter, it is possible to provide a large air collecting space above the ring of filter slots, whereby clearly the venting function of the novel filter cover is improved.

It is also desirable in accordance with the invention if the frustoconical portion of the hollow tube has an annular sealing lip, on the inward side which is in opposite relationship to the raised connecting portion on the filter cover. To provide a good venting function, the venting passages which are provided by the structural members should be maintained undeformed throughout the entire period of operation, by virtue of satisfactory limitations, even if the end consumer for example removes the hollow tube from the filter cover or the filter cover from the purification insert, and then re-assembles the arrangement. The annular sealing lip on the inward side of the hollow tube ensures that any water to be purified does not flow into the hollow tube from above or from the side but that the air collecting chamber above the ring with the filter slots is and remains satisfactorily connected to the interior of the hollow tube.

The increase in the size of the raised connecting portion on the filter cover, in comparison with the raised portion in the known water treatment device, and the correspondingly large frustoconical portion at the lower inner end of the hollow tube, also gives an advantage from the point of view of manufacturing procedure. Specifically, the filter insert, the hollow tube and other parts of the water treatment device according to the invention comprise plastics material which is processed in known manner by injection moulding or the like. Preferably the hollow tube and/or the filter cover are designed with frustoconical or conical surfaces because then the injection moulding tool can be of a simpler configuration and the moulded components can be better removed from the mould.

A similar advantage from the point of view of manufacturing procedure is also achieved in accordance with the invention in particular when the external screwthread of the filter cover and/or the internal screwthread of the hollow tube is/are in the form of round screwthreads. The comparatively large configuration of the raised connecting portion of the filter cover on the one hand and of the frustoconical portion on the hollow tube on the other hand gives the above-indicated advantage of over-expansion when removing the moulded components from the mould. If in addition one or even both screwthreads is/are in the form of a round screwthread, over-expansion is still further simplified. In that way when removing the components from the mould, the screwthread can be better pressed past the tool. The hollow tube will generally also be of a frustoconical configuration for reasons of removal of the components from the mould and to provide an improvement in production.

In an advantageous development the invention is also characterised in that, when the purification insert is fitted into the funnel of the water treatment device, with the hollow tube and the filter cover fitted thereon, the upper outer end, which has at least one opening, of the hollow tube, projects beyond the upper edge of the funnel. In other words the length of the hollow tube, in the condition of being screwed on to the filter cover, is greater than the height of the wall of the funnel so that the at least one opening of the hollow tube, at its upper outer end, is not below the surface of the water in the funnel. It will be appreciated that that improves the venting function of the novel filter cover while in addition handling for the end consumer is even better.

Further advantages, features and possible uses of the present invention will be apparent from the following description of a preferred embodiment with reference to the accompanying drawings in which:

FIG. 1 is a partly sectional view of the entire water treatment device with filter cover and hollow tube fitted thereon, FIG. 2 is a side view of the filter cover, FIG. 3 is a side view of the hollow tube with disc, FIG. 4 is a plan view of FIG. 3, that is to say viewing on to the hollow tube with the disc surrounding same on the outside thereof in an annular configuration, FIG. 5 is a view in cross-section through the hollow tube with the frustoconical portion with internal screwthread, FIG. 6 shows the arresting ring, the arresting tongue, the pointer and the arresting means in the form of a pin, FIG. 7 is a plan view of the arresting ring with pointer and arresting tongues, FIG. 8 is a side view of the hollow tube with frustoconical portion and disc, wherein the arresting ring with pointer and arresting tongue are shown in the mounted condition, in section, and FIG. 9 is a plan view of the hollow tube of FIG. 8 with pointer and arresting ring non-detachably disposed thereon.

Referring to FIG. 1, shown therein is the whole of the water treatment device with the collecting container 1 with a handle (not identified) on the right-hand side in FIG. 1, and the pouring spout on the opposite left-hand side. The funnel 2 which at its bottom carries a sleeve 3 is fitted at the top on the edge of the collecting container 1. The purification insert 4 which is only shown in diagrammatic form is arranged in the sleeve 3. The purification insert 4 is covered at the top with the filter cover which is generally identified by 5. The filter cover 5 is shown in greater detail in FIG. 2 and comprises a conical annular surface portion 6 with straight filter slots 7 which extend in a ring-like configuration around the main axis (not identified) which is disposed on the longitudinal axis of the sleeve 3 and therewith also the purification insert 4. In addition at the centre the filter cover 5 which is shown in FIG. 2 has a raised connecting portion 8 which at the top is provided with vent openings 9 in the form of fine slots.

It will also be seen from FIG. 1 that a hollow tube which is generally identified by 10 is fitted or better screwed on the raised connecting portion 8 of the filter cover 5. The elongate frustoconical hollow tube 10 is open upwardly and in its lower portion, beside the annular disc 11 which is disposed at the lower inner end, it has a frustoconical portion 12. The diameter of the frustoconical portion 12 is larger than that of the upper end of the hollow tube 10, in a stepped relationship. The frustoconical portion 12 fits on to the thickened raised connecting portion 8 of the filter cover 5. The internal screwthread 13 in the frustoconical portion 12, as shown in FIG. 5, fits on to the external screwthread 14 of the raised connecting portion 8, which external screwthread 14 is only formed by discontinuous portions of screwthread configuration. Both the external screwthread 14 of the portion 8 and also the internal screwthread 13 of the frustoconical portion 12 of the hollow tube 10 are in the form of round screwthreads.

When viewing downwardly on to the annular surface of the disc 11, as shown in FIGS. 4 and 9, it is possible to see the markings 15 which are provided on that upper outer surface of the disc 11, in the form of holes and in the form of labels 16 ('JAN.; FEB.').

While the hollow tube 10 with disc 11 is shown on its own in FIGS. 3 and 4, the views in FIGS. 8 and 9 show how a pointer 17 is associated with the markings 15 and 16. The pointer 17 is mounted by way of an arresting tongue 18 on an arresting ring 19. The latter is disposed non-detachably and rotatably in an undercut configuration 20, (see FIGS. 3 and 5) which is formed on the one hand by the outer upper bead ring 21 and on the other hand by the step 22 of the frustoconical portion 12.

Formed beside the pointer 17 is an arresting means 23 in the form of a pin. The arresting pin 23 is fitted in FIG. 9 into the hole 15 identified by 'January'.

FIGS. 4 and 9 also show the opening 24 of the hollow tube 10, which in the arrangement shown in FIG. 1 can be seen to extend above the upper edge 25 of the funnel 2.

The air collecting space in the filter cover 5 (FIG. 2) may be of a particularly advantageous and large configuration, above the frustoconical surface portion 6 with the filter slots 7, by virtue of the diameter d of the raised connecting portion 8 being only immaterially smaller than the diameter D of the frustoconical surface portion 6. In FIG. 2 the construction uses average values in respect of the diameters d and D of the frustoconical portions 6 and 8, but anyone looking at FIG. 2 will immediately recognise the thickened configuration of the portion 8 with the advantage of better removal of the moulded component from the mould after the operation of injection moulding the filter cover 5.

Finally FIG. 5 shows a view in section of the hollow tube 10 without the filter cover 5 being shown in the condition of being screwed therein. It will be seen however that the annular frustoconical step 22, that is to say the annular surface which connects the enlarged lower end of the upper hollow tube 10 to the narrower tapered upper end of the frustoconical portion 12 is provided with a sealing lip 26 on the inward side on which the internal screwthread 13 is also disposed. That sealing lip 26, in the form of a circular ring, extends around the opening between the frustoconical portion 12 and the upper smaller frustoconical portion of the hollow tube 10 in such a manner that when the filter cover 5 is screwed in, the annular sealing lip 26 also comes to lie around the slots 9 on the top side of the portion 8 of the filter cover 5. In the screwed-together condition of the assembly as shown in FIG. 1, the sealing lip 26 also ensures that air accumulated in the air collecting space, that is to say in the raised portion 8 of the filter cover 5, can pass without being impeded by the water entering from above, through the slot openings 9 into the hollow tube 10 and can escape upwardly through the opening 24.

I claim:

1. A filter cover for a purification insert (4) in a water treatment device, wherein the filter cover (5) has filter slots (7) on a conical surface portion (6) and at least one vent opening (9) in the middle of a raised connecting portion (8), and can be connected to a hollow tube (10) with a disc (11), characterised in that the filter slots (7) are substantially straight and are arranged in a ring-like configuration on the frustoconical surface portion (6) which occupies about ⅓ to ½ of the height of the filter cover (5) and that provided on the upper outer annular surface of the disc (11) are markings (15, 16) with which there is associated an adjustable pointer (17) mounted on an arresting ring (19) which is arranged non-detachably and rotatably on the hollow tube (10).

2. A filter cover according to claim 1 characterised in that the arresting ring (19) is held in an annular undercut configuration (20) and that arranged between the latter and the disc (11) is a frustoconical portion (12) with an internal screwthread (13) which can be screwed on to the external screwthread (14) of the raised connecting portion (8) of the filter cover (5).

3. A filter cover according to claim 1 or claim 2 characterised in that the markings (15, 16) are formed in the annular surface of the disc (11) as holes (15), pins or the like, that provided between the pointer (17) and the arresting ring (19) is an arresting tongue (18) which engages over the frustoconical portion (12) of the hollow tube (10) and that the pointer (17) is connected to an arresting means (23) which can be associated with the markings (15, 16).

4. A filter cover according to one of claims 1 or 2 characterised in that the raised connecting portion (8) of the filter cover (5) is in the form of an air collecting space and is of a diameter (d) which is only immaterially smaller than the diameter (D) of the frustoconical surface portion (6) with the filter slots (7).

5. A filter cover according to claim 2 characterised in that the frustoconical portion (12) of the hollow tube (10) has an annular sealing lip (26) on the inward side which is in opposite relationship to the raised connecting portion (8) of the filter cover (5).

6. A filter cover according to claim 2 characterised in that the external screwthread (14) of the filter cover (5) and/or the internal screwthread (13) of the hollow tube (10) is/are in the form of a round screwthread.

7. A filter cover according to one of claims 1 or 2 characterised in that, when the purification insert (4) is fitted into the funnel (2) of the water treatment device, with the hollow tube (10) and the filter cover (5) fitted thereon, the upper outer end, which has at least one opening (24), of the hollow tube (10) projects beyond the top edge (25) of the funnel (2).

* * * * *